United States Patent [19]

Lester et al.

[11] 4,392,089

[45] Jul. 5, 1983

[54] ISOLATOR FOR USE WITH FREQUENCY RESPONSIVE SWITCHING CIRCUIT

[75] Inventors: James N. Lester, Rockport, Mass.; Lee A. Prager, Raymond, Me.

[73] Assignee: GTE Products Corporation, Stamford, Conn.

[21] Appl. No.: 285,205

[22] Filed: Jul. 20, 1981

[51] Int. Cl.³ ........................ H04Q 1/45; H05B 41/36

[52] U.S. Cl. .................................... 315/313; 315/208; 315/258; 315/284; 340/310 A; 340/825.73

[58] Field of Search ............... 315/208, 258, 259, 283, 315/284, 313, 362; 340/310 R, 310 A, 825.71, 825.73

[56] References Cited

U.S. PATENT DOCUMENTS

| | | | |
|---|---|---|---|
| 3,729,710 | 4/1973 | Sherwin | 340/825.71 |
| 3,971,010 | 7/1976 | Foehn | 340/310 R |
| 4,190,790 | 2/1980 | Plumb et al. | 315/313 |

*Primary Examiner*—Eugene R. La Roche

*Attorney, Agent, or Firm*—Edward J. Coleman

[57] ABSTRACT

A frequency responsive power control system includes an improved isolator in series electrical connection with respect to a ballasted lamp load. The isolator has a high inductive impedance at low current for blocking ballast induced noise signals from interferring with proper operation of frequency responsive switching circuits in the system. In a particularly useful embodiment, the isolator is inductively matched to the capacitive characteristic of the ballasted lamp load so that the isolator-load circuit combination is resonant at a frequency sufficiently removed from any of the control system activation frequencies so as to block any noise signals induced by the ballasted load which might otherwise cause undesired activation of the switching circuits and flickering of the ballasted lamp loads. Under saturation current, with the switching circuit conducting, the isolator functions collectively with the load to provide an impedance which blocks control signals from reaching the load.

20 Claims, 3 Drawing Figures

ISOLATOR FOR USE WITH FREQUENCY RESPONSIVE SWITCHING CIRCUIT

BACKGROUND OF THE INVENTION

This invention relates to an improved isolator for use with a power control system and, more particularly, to an improved isolator for use in a lamp control system to substantially prevent noise signals from causing lamp flickering.

U.S. Pat. No. 3,971,010 entitled "Ballasted Load Control System and Method," by R. Foehn, issued July 20, 1976, and now incorporated by reference herein, describes a load control system particularly useful for selectively controlling the energization of ballasted lamps in a manner facilitating the implementation of energy conservation measures. More specifically, the system permits the ballasted loads to be selectively disconnected from a power circuit without disturbing other loads connected to the circuit and without substantial modification of existing wiring. Control signals having respective preselected frequencies are applied to the power circuit conductors at a convenient location remotely of the loads. Frequency sensitive switching circuits connect the loads to the conductors and these switching circuits are actuated in response to the control signals to energize only the desired loads.

Briefly, each of the frequency sensitive switching circuits used in the system comprises a solid state switching device, such as a triac, for controlling the conductance between a pair of first and second main terminals. Tuned circuits connect the gate of the triac in a well-known manner to the AC power conductors and are activated to resonate in response to control signals of select frequency being superimposed with respect to the AC input power signal. Thus, in the absence of a control signal having the select frequency at which the tuned gate control circuits resonate, the gate will not be activated and the triac will remain non-conductive. If the load comprises one or more ballasted fluorescent lamps, then the light system controlled by this triac switching circuit will remain turned off. In order to energize this section of the lighting system, a remotely located frequency generator is activated to superimpose on the AC power line conductors a control signal having a frequency matched with that at which the above-mentioned tuned gate control circuit will resonate to activate the gate of the triac. Once the triac is activated by the select frequency control signal to conduct the AC power signal to the load, the frequency sensitive switch must be continuously activated by the control signal frequency in order to keep the triac conducting and maintain the energization of the load. Once the control signal is terminated, the triac will be turned off and the load will be deenergized.

U.S. Pat. No. 4,190,790, entitled "Isolator Circuit for Use With Frequency Sensitive Switching Circuit," by J. Plumb et al., issued Feb. 26, 1980, in common assignment herewith and now incorporated by reference herein, describes an isolator circuit for use with the above-described switching circuits in order to solve a problem which arises when such circuits are employed with lamp ballasts incorporating large capacitors for radio frequency interference (RFI) shunting. If the control signal frequencies (typically in the range of 20 kHz to 90 kHz ) are transmitted through such (RFI) shunting ballasts, the comparatively large capacitance value of the ballast provides a heavy load on the remotely located signal frequency generator thereby imposing excessive drain on signal generated power. The isolators of the aforementioned Plumb et al patent are connected in serial relation with respect to each load and comprise a plurality of parallel LC circuits each tuned to resonate at a particular control signal frequency so as to block that particular control signal frequency from reaching the load. In this manner, the heavy load on the remotely located signal generator is alleviated and the power which otherwise would be lost is conserved. However, these isolator circuits are of narrow bands of isolation which bands are subject to frequency shifts caused e.g. by heat or vibrations of such circuits. Further the above-described switching circuits, can also be falsely activated by extraneously generated noise which is superimposed on the power conductor lines. If such extraneous noise momentarily activates the frequency sensitive switching circuit, the switching circuit will momentarily apply power to the ballasted load which in turn will generate a wide band noise pulse. The induced load noise then couples directly through the activated switch onto the power conductor lines and becomes a source of extraneous noise for other frequency sensitive switching circuits. A "domino" effect takes place, and lamps will begin to flicker continuously.

SUMMARY OF THE INVENTION

Accordingly, it is a primary object of this invention to provide a simple and economical isolator for use with a frequency sensitive switching system to inhibit the false activation of the system by load induced noise signals which may be superimposed on the power conductor lines.

Another object is to provide, in a frequency sensing switching system for a ballasted load, an improved isolator for blocking control signals which might be transmitted via the switch to the load.

It is a further object of this invention to provide, in a frequency sensitive power control switching system for a ballasted load, an improved isolator for inhibiting ballast induced noise signals from activating frequency sensitive switches in a manner which can cause erratic system operation, such as lamp flickering.

These and other objects, advantages and features are achieved in accordance with the invention which provides an improved isolator in a power control system. The power control system includes means for selectively generating a frequency control signal, at least one ballasted load, and frequency responsive switch means connected to respond to the frequency control signal by switching from a substantially non-conductive state to a substantially conductive state to enable the conduction of an AC power signal to the ballasted load. The improved isolator is connected in series relation with respect to the frequency responsive switch means and the ballasted load. The isolator includes an inductor which has high impedance at least at the frequency of the control signal, below a saturation current for such inductor, so as to sufficiently block any noise signals induced by the ballasted load which would otherwise cause undesired activation of the frequency responsive switch means.

The invention further provides another embodiment of an improved isolator in a power control system, wherein the control system comprises means for selectively generating a frequency control signal, at least one ballasted load having a capacitive characteristic associated therewith, and a frequency responsive switch connected to respond to the frequency control signal by switching from a substantially non-conductive state to a substantially conductive state to enable the conduction of an AC power signal to the ballasted load. The improved isolator is connected in series relation with respect to the frequency resonsive switch and the ballasted load and, at below a saturation current therefor, has an inductance characteristic which is matched to the capacitive characteristic of the ballasted load. The match between the inductive characteristic of the isolator and the capacitive characteristic of the ballasted load provides an isolator-load circuit combination which is resonant at a frequency substantially different than the frequency of the control signal, thereby sufficiently blocking any noise signals induced by the ballasted load which would otherwise cause undesired activation of the frequency responsive switch means. In cases where the ballasted load is a lamp, the blocking function of the isolator-load combination prevents lamp flickering caused by switch activation as a result of ballast induced noise.

BRIEF DESCRIPTION OF THE DRAWINGS

The invention is further disclosed in the following detailed specification and drawings in which.

DESCRIPTION OF PREFERRED EMBODIMENT

Figure 1:
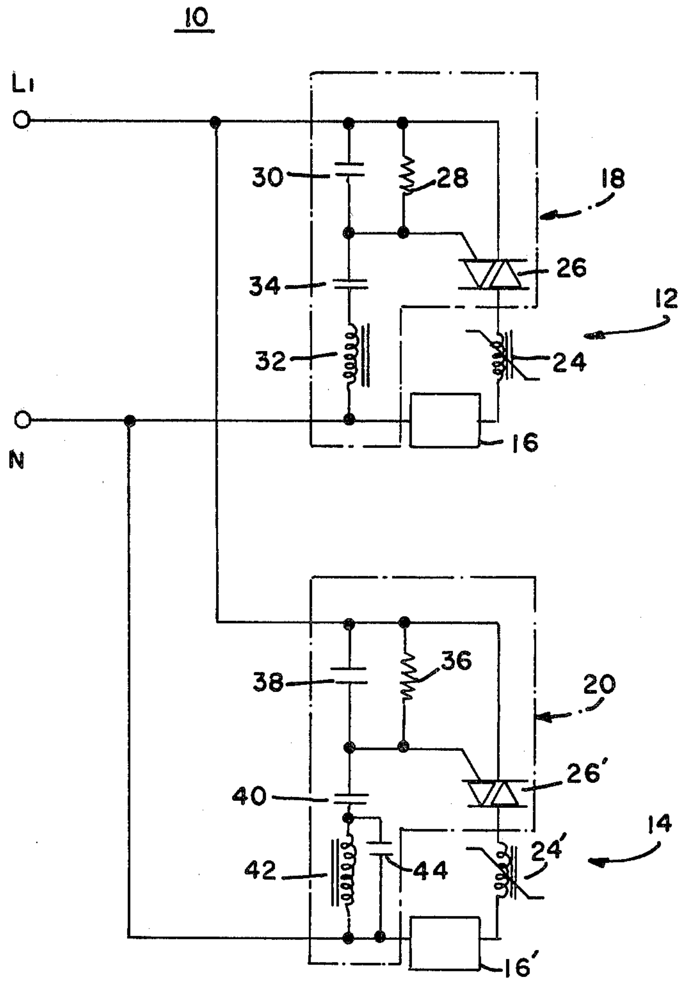
FIG. 1 is a circuit diagram of a pair of frequency sensitive switching circuits in combination with respective isolators and loads according to the invention.

Referring now to FIG. 1, there is shown a portion of a power control system which may be utilized in connection with a conventional three phase, four wire power distribution system of a type which is widely used in existing buildings and which is fully described in the aforementioned U.S. Pat. No. 3,971,010. The distribution system may include three phase conductors and a neutral conductor which supply power to the building from an external source, typically at a line frequency of 60 Hz and an RMS voltage of up to 600 volts between each of the phase conductors and the neutral conductor. Within the building, power may be supplied to branch circuits, of which one is shown at 10 in FIG. 1. The branch circuit 10 of FIG. 1 is connected to receive a 60 Hz AC power signal between a line conductor $L_1$ and a neutral conductor N which connect to phase and main neutral conductors at a distribution panel in the manner as is disclosed in the above-mentioned U.S. Pat. No. 3,971,010.

In the branch circuit 10, the number of loads, such as lamps or other electrical appliances, are commonly connected in parallel between the line conductor $L_1$ and the neutral conductor N of the circuit in a manner to be herein described. The power control system includes means for applying control signals of predetermined frequency to the conductors of the branch circuit 10. The branch circuit 10 comprises two channels 12 and 14, each of which is connected to power respective ballasted loads 16, 16'. Each channel 12, 14 may be activated to power its respective ballasted load 16, 16' by a control signal of selected frequency which may be superimposed on the 60 Hz AC input power signal applied between the line conductor $L_1$ and the neutral conductor N. A plurality of frequency control signal generators (not shown) are provided for selectively superimposing the frequency control signals in the manner as fully described in the aforementioned U.S. Pat. No. 3,971,010.

Channel 12 of the branch circuit 10 comprises a frequency sensitive switch circuit, as shown generally at 18, which includes a bidirectional switching device such as a triac 26 having a first main terminal connected to the input line conductor $L_1$, a second main terminal connected to one side of the load 16 through an isolator 24 according to the invention, and a control gate for controlling conductivity between the first and second main terminals. A resistor 28 and capacitor 30 connected in parallel relation with respect to each other connect between the control gate and the first main terminal of the triac 26. A series resonant circuit comprising an inductor 32 and capacitor 34 connect between the triac control gate and the neutral conductor N. The values of the LC components 32 and 34 are selected to provide a circuit tuned to resonate at the frequency of a selected one of the previously discussed control signals which can be superimposed on the 60 Hz input power signal applied between the line conductor $L_1$ and the neutral conductor N.

In like manner, the second channel 14 also comprises a frequency sensitive switching circuit as shown generally at 20 having a bidirectional switching device, such as a triac 26', having a first main terminal connected to the input line conductor $L_1$, a second main terminal coupled to one side of the load 16' through an isolator 24' according to the invention, and a control gate for controlling conductivity between the first and second main terminals. A resistor 36 connected in parallel relation with respect to a capacitor 38 connects between the control gate and the first main terminal of the triac 26'. A series resonant circuit comprising a capacitor 40 serially connected with respect to an inductor 42 in parallel connection with respect to a capacitor 44, is coupled between the triac control gate and the neutral line conductor N. The values of the capacitors 40 and 44 and the inductor 42 are selected to provide a circuit tuned to resonate at a selected frequency of one of the previously discussed control signals and to block adjacent channel control signals which can be superimposed on the 60 Hz AC input power signal. As will be readily understood, the frequency responsive switching circuits 18 and 20 are tuned to resonate at different control signal frequencies in order to permit the selective switching of either one of the circuits 18 or 20 independently of the other in a manner to be subsequently described.

By way of example, the loads 16 and 16' will be assumed to be lamp ballasts incorporating capacitive values in the order of 0.01 MFD for radio frequency interference (RFI) shunting. Under conditions where the input line conductor $L_1$ is energized with a 60 Hz AC input power signal and there are no control signals superimposed thereon having frequencies to which the frequency sensitive switch circuits 18 and 20 are tuned to respond, the triacs 26 and 26' will remain turned off in substantially non-conductive states so as not to apply the AC power signal to the loads 16 and 16'.

If a control signal having a frequency corresponding to the tuned resonance of the frequency sensitive switch circuit 18 is superimposed across the line conductor $L_1$ and the neutral conductor N, there will be developed in a well-known manner a sufficient voltage on the control gate terminal of the triac 26 to cause that triac to turn on and assume a substantially conductive state so as to apply the 60 Hz AC input power signal to energize the ballasted load 16. As is readily apparent, as long as the control signal frequency to which the frequency sensitive switching circuit 18 is tuned to resonate remains superimposed on the input line conductor $L_1$, the triac 26 will remain turned on in its conductive state to energize the load 16 with the 60 Hz AC input power signal.

In like manner, if a control signal having a frequency corresponding to the tuned resonant frequency of the frequency sensitive switching circuit 20 is superimposed on the AC input power signal across the line conductor $L_1$ and the neutral conductor N, the required gating voltage will be developed on the control gate of the triac 26' so as to cause it to turn on to a substantially conductive state to conduct the 60 Hz AC input power signal to energize the ballasted load 16'. Again, as is readily apparent, the triac 26' will remain in its conductive state to conduct the 60 Hz AC input power signal to the load 16' as long as the aforesaid control signal, having a frequency to which the frequency sensitive switch 20 is tuned to resonate, is superimposed on the AC input power signal. Although the preferred embodiments for the frequency sensitive switching circuits are shown at 18 and 20, it will be readily apparent that other frequency sensitive circuits such as shown in U.S. Pat. No. 3,971,010, U.S. Pat. No. 4,190,790, and U.S. Pat. No. 4,229,681 may be also utilized without affecting the scope of the invention herein described.

In accordance with the present invention, each channel 12, 14 includes, respectively, the isolator 24, 24' connected in serial relation between the second main terminal of its respective triac 26, 26' and its respective load 16, 16'. Each isolator 24, 24' preferably comprises a variable reactance inductor which saturates at a select low current value, which may be in the order of 250 ma. The inductive value of each isolator 24, 24', which by way of example may be in the order of 50 mH, is selected with respect to the capacitive component, i.e., 0.01 MFD, of its respective ballasted lamp load so that the circuit combination of each isolator 26, 26' and its respective load 16, 16' has a resonant frequency substantially lower than the lowest of the control signal frequencies which can activate the frequency sensitive switching circuits 18 or 20.

Under conditions where there are no frequency control signals deliberately superimposed on the line conductor $L_1$ to activate either one of the frequency sensitive switching circuits 18 or 20, there may still be superimposed extraneously generated noise signals of sufficient magnitude to momentarily activate either one of the frequency sensitive switching circuits 18 or 20, thereby causing power to be applied to the ballast which in turn will generate a wide band noise pulse. If the induced load noise were not inhibited, it could pass back through the activated switch onto the power conductor lines and become a source of extraneous noise for other frequency sensitive switching circuits. A "domino" effect takes place as one circuit after another is momentarily activated and lamps, which are intended to be shut off, will flicker in a continuous, annoying and potentially damaging manner.

Each isolator 24, 24', however, operates in conjunction with the capacitance of its respective ballasted load 16, 16' to provide an isolator-load circuit combination having a respective resonant frequency which is substantially below the activation frequencies of either of the frequency sensitive switches 18 or 20, thereby sufficiently blocking any noise signals induced by the ballasted load which would otherwise cause undesired activation of either one or both of the frequency sensitive switches 18 and 20. This prevents any false activation of the lamps which may result in undesirable flickering. By way of example, it may now be assumed that the frequency sensitive switch circuit 18 is tuned to be activated into conduction by a frequency control signal in the order of 50 kHz and that the frequency sensitive switching circuit 20 is tuned to be activated into conduction by a frequency control signal in the order of 30 kHz. Under the aforementioned conditions where extraneous noise signals momentarily activate the frequency sensitive switch circuits 18 and 20 into conduction, the isolators 24 and 24' and their respective loads 16 and 16' operate in combination to provide a resonant frequency of about 7.1 kHz, which is far below the activation frequencies of 30 kHz and 50 kHz. In addition, it will be readily appreciated that the momentary activation of the frequency sensitive switching circuits by extraneous noise signals results in only low current levels less than the 250 milliamperes required to saturate the variable reactance inductor isolators 24 and 24'. Since the ballast induced noise signals are immediately blocked from activating switches 18 and 20, neither triac 26 or 26' is maintained in its conductive state long enough for the current to increase sufficiently to saturate its respective isolator core and thus cause its respective lamp to flicker. Thus, even though the extraneous noise signals may be sufficient to momentarily activate either one of the frequency sensitive switching circuits 18 or 20, there will be no continued activation sufficient to saturate the inductive isolator cores and cause the lamps to flicker since the ballast induced noise signals are immediately rendered effectively harmless to the system by the isolator-load resonance at a frequency substantially different than the control signal activation frequencies.

When either one or both of the frequency sensitive switches 18 and 20 respond to their activation control signal frequency and switch to a conductive state, the isolators 24, 24' provide for a low buildup of current to protect their respective triacs 26, 26' from potentially damaging current spikes. As previously discussed, as the current through each isolator 24, 24' increases to 250 milliamperes, the core saturates and the impedance drops dramatically permitting full load currents which may be in the order of 0.4 amps to 2 amps to be directed to the respective ballasted lamp load. Under these high currents, the effective impedance of the isolators 24, 24' to the 60 Hz AC power signal may be in the order of 0.7 ohms thereby absorbing only a very small portion of the 60 cycle AC power signal.

When a saturation current (0.4 to 2 amps) powers the ballasted load, the isolator of the invention serves to conserve power. By way of example, referring to the circuit 10 of FIG. 1, at the selected activation frequency, the effective load impedance of the switching circuit 18 (or 20) is 75 ohms and the combined impedance of the isolator 24 (or 24') and the ballasted load 16 (or 16') in parallel circuit therewith, is several hundred ohms. Accordingly, employing a 30 kHz frequency control signal to activate the circuit 14, the isolator 24' and the ballasted lamp load 16' collectively define a total impedance of about 307 ohms which, when compared to the switching circuit impedance of 75 ohms, substantially operates to block any control signals which might be directed to the ballasted lamp load 16'.

Further such combined impedance of 307 ohms compared with the impedance of only the ballasted lamp load 16' of 100 ohms, operates to reduce the ballast power consumption of the 30 kHz frequency control signal by approximately 33%. In like manner, employing a 50 kHz frequency control signal to activate the circuit 12, the isolator 24 and the ballasted lamp load 16 combine to provide a collective impedance of 501 ohms. Again, this collective impedance of 501 ohms at 50 kHz, operates to effectively block any control signals which might otherwise be directed to the ballasted lamp load 16. Further such combined impedance of 501 ohms, compared with the impedance of only the ballasted load 16 of 100 ohms, likewise operates to reduce ballast control signal power consumption so that there is additionally conserved approximately 40% of the 50 kHz frequency control signal power.

Where one or more ballast loads have no capacitance therewith, the isolator, i.e., the variable reactive inductor embodying the invention, still presents a broad band of impedance, at least at the receiver control frequencies e.g., including 30 kHz and 50 kHz, when less than the saturation current, e.g. below 250 ma, flows through its windings. For example, the impedance at 30 kHz is 9.4 kohms and at 50 kHz is 15.7 kohms at such low current. Such impedance is sufficiently high to block ballast induced noise signals from undesirably activating the frequency sensitive switches and, thereby, causing lamp flickering.

The inductor of the invention upon receiving a saturation current therethrough, e.g. 250 ma to rated 2.0 amps, presents a low impedance e.g, 0.7 ohms to a 60 Hz AC input power signal, as previously discussed.

Figure 2:
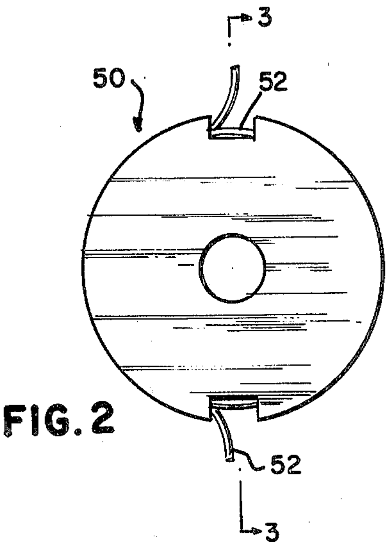
FIG. 2 is a top view of a preferred configuration for the isolator of the invention.
Figure 3:
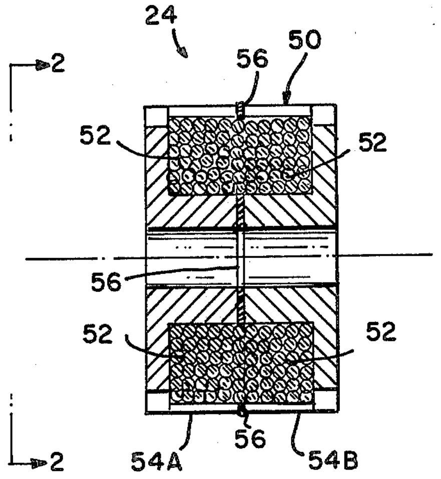
FIG. 3 is a cross-sectional view of the isolator taken along lines 3—3 of FIG. 2.

Referring now to FIGS. 2 and 3, there is shown a preferred construction for the variable reactance isolators 24, 24' comprising a cylindrical core 50 selected from the manganese-zinc-iron class of ferrite materials manufactured and sold under the "Fair-Rite, type 72," Pot Core trademark. The core can be of various shapes and sizes. A ferro-magnetic material such a powdered metal core, steel laminations, or other types of ferrite materials can also be utilized; however, the ferrite type 72 core is preferred because of its low cost, sharp saturation knee, high initial permeability, and wide frequency range of operation. The core 50 is kept as small as practical in order that it may be easily saturated while at the same time yielding the requisite inductance of 50 mH at low currents less than the 250 ma saturation current and 1.64 mH at full load currents in the order of 2 amps. Such may be accomplished by using a number 23 copper wire, as shown at 52, which guage wire can still safely conduct the aforementioned 2 ampere current. The winding resistance typically may be about 0.33 ohms. The core 50 preferably comprises 2 cup-shaped halves 54A and 54B which are fastened together by a thin epoxy 56 cured under pressure to minimize the air gap between the core halves 54A and 54B. Thus, in this manner, the unsaturated resonant frequency of the isolator 24, 24' and ballast 16, 16' is minimized and the inductance is maximized by packing the maximum number of wire turns into the core. The wire can be of various conductive materials, e.g., copper or aluminum and preferably is of copper.

Although the described circuit can be made using component values and ranges suitable for each particular application, as is known in the art, the following table lists components, values and types for a frequency sensitive switching circuit and isolator combination made in accordance with the present invention.

TABLE I

| | | |
|---|---|---|
| Triac | 26, 26' | Teccor type Q6008L4 |
| Resistor | 28 36 | 100 ohms |
| Capacitor | 30, 38 | 0.068 microfarad |
| Capacitor | 34, 44 | 0.0022 microfarad |
| Capacitor | 40 | 0.0047 microfarad |
| Inductor | 32, 42 | 4.2 millihenries |

Although the frequency sensitive switching circuits 18 and 20 have been described as responding to select frequency control signals, i.e., 50 kHz and 30 kHz, it may be readily apparent that such frequency sensitive circuits may be activated by any frequency control signal within a narrow frequency band centered about the particular activation frequency and that the isolators 24 and 24' thus operate in conjunction with their respective ballasted lamp loads 16 and 16' to provide respective resonant frequencies outside the narrow bands of frequencies to which the frequency sensitive switching circuits respond.

Since certain changes may be made in the above-described invention without departing from the scope of the invention herein involved, it is intended that all matter contained in the description thereof or shown in the accompanying drawings shall be interpreted as illustrative and not in a limiting sense.

What is claimed is:

1. In a power control system comprising means for selectively generating a frequency control signal, at least one ballasted load, and frequency responsive switch means connected to respond to the frequency control signal by switching from a substantially non-conductive state to a substantially conductive state to enable the conduction of an AC power signal to the ballasted load, the improvement comprising:

an isolator connected in series relation with respect to the frequency responsive switch means and the ballasted load, which isolator comprises an inductor having high impedance, at least at the frequency of said control signal, below a saturation current for said inductor so as to sufficiently block any noise signals induced by said ballasted load which would otherwise cause undesired activation of said frequency responsive switch means.

2. In a power control system comprising means for selectively generating a frequency control signal, at least one ballasted load having an inherent capacitive characteristic associated therewith, and a frequency responsive switch means connected to respond to the frequency control signal by switching from a substantially non-conductive state to a substantially conductive state to enable the conduction of an AC power signal to the ballasted load, the improvement comprising:

an isolator connected in series relation with respect to the frequency responsive switch means and the ballasted load, said isolator, at below a saturation current therefor, having an inductance characteristic matched to the capacitive characteristic of the ballasted load so that the isolator-load circuit combination is resonant at a frequency substantially different than the frequency of said control signal, thereby sufficiently blocking any noise signals induced by said ballasted load which would otherwise cause undesired activation of said frequency responsive switch means.

3. The improvement of claim 1 or 2 wherein said isolator is a variable reactance inductor which saturates at a select current input thereto, which select current is above the current directed to said isolator if extraneous noise signals cause the frequency responsive switch means to momentarily switch from its non-conductive state to its conductive state.

4. The improvement of claim 3 wherein the switching of the frequency responsive switch to its conductive state in response to the frequency control signal operates to conduct the AC power signal to said isolator so as to saturate said isolator while at the same time said isolator and ballasted load collectively define an impedance which operates to substantially block any control signals which might be transmitted through said frequency responsive switch to said ballasted load.

5. The improvement of claim 3 wherein said inductive isolator comprises a wire winding around a core of ferro-magnetic material.

6. The improvement of claim 5 wherein said inductor core comprises two half sections fastened together by a thin epoxy to minimize the air gap therebetween.

7. The improvement of claim 5 wherein said inductive isolator comprises a winding of copper wire around a ferrite core, comprising manganese, zinc and iron.

8. The improvement of claim 2 wherein the frequency responsive switch responds to the frequency control signal when the frequency of the control signal is within a band of select frequencies and wherein said resonant frequency is outside said band of select frequencies.

9. The improvement of claim 2 wherein the resonant frequency of said isolator-load circuit combination is about 7 kHz.

10. The improvement of claim 1 or 2 wherein said inductor has a high impedance in a broad band of frequencies including the frequency of said control signal.

11. The improvement of claim 1 or 2 wherein said isolator, below said saturation current, has an impedance at 30 kHz and at 50 kHz of between 5 and 20 kohms.

12. The improvement of claim 1 or 2 wherein said inductor presents high impedance at select frequencies below a select saturation current therefor and which inductor presents low impedance at or above said saturation current to permit energization of said ballasted load.

13. The improvement of claim 12 wherein said inductor has a saturation current of above between 200 to 300 ma and said ballasted load is energized at between 0.4 to 2.0 amps at a 60 Hz AC input power signal.

14. The improvement of claim 13 wherein said inductor has an inductance, at less than said saturation current, of 50 mH and, at 2 amps, of 1.64 mH.

15. In a power control system comprising means for selectively generating at least two different frequency control signals, at least two ballasted loads each having an inherent capacitive characteristic associated therewith, at least two frequency responsive switches each connected to respond to a respective one of the two or more frequency control signals by switching from a substantially non-conductive state to a substantially conductive state to enable the conduction of an AC power signal to one of the ballasted loads respectively, the improvement comprising:

at least two isolators each connected in series relation with a respective one of the frequency responsive switches and ballasted loads and each, at below a saturation current therefor, having an inductive characteristic matched to the capacitive characteristic of the ballasted load to which it connects so that each isolator-load circuit combination is resonant at a frequency substantially different than the two or more frequency control signals, thereby sufficiently blocking any noise signals induced by a respective one of said ballasted loads which would otherwise cause undesired activation of one or more of said frequency responsive switches.

16. The improvement of claim 15 wherein each of said isolators is a variable reactance inductor which saturates at a select current input thereto, which select current is above the current directed to each isolator if extraneous noise signals cause the frequency responsive switch connected to that isolator to momentarily switch from its non-conductive state to its conductive state.

17. The improvement of claim 16 wherein each frequency responsive switch responds to a respective one of the frequency control signals when the frequency of that one control signal is within a band of select frequencies and wherein said resonant frequency is outside the bands of frequencies respectively associated with the frequency control signals.

18. The improvement of claim 16 wherein the switching of each frequency responsive switch to its conductive state in response to its respective frequency control signal operates to conduct the AC power signal to its respective isolator so a to drive it into saturation, while at the same time each serially-connected isolator and ballasted load collectively define an impedance which operates to substantially block any control signals which might be transmitted through its respective frequency sensitive switch to said ballasted load.

19. The improvement of claim 16 wherein each of said inductive isolators comprises a winding of copper wire around a ferrite core comprising manganese, zinc and iron.

20. The improvement of claim 19 wherein each of said inductive cores comprises two half sections fastened together by a thin epoxy to minimize the air gap therebetween.

* * * * *